United States Patent [19]

Morris, Jr.

[11] 3,920,858

[45] Nov. 18, 1975

[54] COMPOSITION FOR APPLICATION TO PLANT MATERIAL AND METHOD OF MAKING SAME

[76] Inventor: Sammie R. Morris, Jr., 2705 Eldorado Drive, Mobile, Ala. 36605

[22] Filed: Apr. 16, 1973

[21] Appl. No.: 351,614

Related U.S. Application Data

[63] Continuation of Ser. No. 60,126, July 31, 1970, abandoned.

[52] U.S. Cl. .................. 426/319; 426/54; 426/69; 426/319; 426/213; 426/380; 426/807
[51] Int. Cl.$^2$ ... A23K 1/02; A23K 1/22; A23K 3/03
[58] Field of Search .......... 426/53, 54, 69, 74, 213, 426/312, 220, 319, 380, 519, 807

[56] References Cited
UNITED STATES PATENTS

| | | |
|---|---|---|
| 2,346,072 | 4/1944 | Haskell et al. .................. 426/69 |
| 2,603,567 | 7/1952 | Stiles .................................. 99/2 |
| 2,760,866 | 8/1956 | Nielsen ............................ 426/220 |
| 3,020,157 | 2/1962 | Fetzer .............................. 426/319 |
| 3,443,956 | 5/1969 | Muller ................................ 99/8 |
| 3,469,989 | 9/1969 | Gagolski et al. ................ 426/213 |
| 3,512,986 | 5/1970 | Snyder et al. ..................... 426/74 |
| 3,753,723 | 8/1973 | Henderson et al. ............... 426/69 |

Primary Examiner—Norman Yudkoff
Assistant Examiner—Curtis P. Ribando
Attorney, Agent, or Firm—Cushman, Darby & Cushman

[57] ABSTRACT

A process for the manufacture of a silage innoculant containing ammonia, water, molasses and minerals required to supplement the diet of ruminant animals. The minerals are first dissolved in the water and then the ammonia is added. Heat liberated during the addition of ammonia is removed and then the molasses is added.

6 Claims, No Drawings

COMPOSITION FOR APPLICATION TO PLANT MATERIAL AND METHOD OF MAKING SAME

This is a continuation, of application Ser. No. 60,126 filed July 31, 1970, and now abandoned.

The present invention relates to a composition for application to plant material in preparation for ensiling, to increase the nutritional value of the silage obtained from the plant material, and a method of making said composition.

In U.S. Pat. No. 3,753,723, there is disclosed a process for the manufacture of a ruminant animal feed by the anaerobic fermentation of plant material in the presence of ammonia. Ammonia is not suitable as a feed component because of toxicity and palatability problems. However, during the fermentation process, the ammonia undergoes chemical reactions which convert it into different chemical compounds which can be consumed safely by ruminant animals. Said patent also discloses the desirability of applying to the plant material minerals which are required in the diet of the ruminant animals and which are believed to have an effect on the composition of the silage.

The present invention is concerned with a composition of matter suitable for supplying the aforesaid ammonia and minerals to the plants material and a method of making said composition.

In applying ammonia to silage it was determined that a liquid composition was preferred because of greater ease of application and more uniform distribution. For the same reason, a liquid carrier for the minerals was preferred. For reasons of economy, it has been proposed to provide solution of ammonia and minerals in water. However, because of solubility limitations created by the minerals needed for ruminant animals, this would involve very large quantities of water. Such large quantities of water could have undesirable effects on fermentation. In addition, it would be difficult to transport, store and handle the large volumes of solution which would be required. On the other hand it would be difficult to achieve a desired degree of uniform distribution of ammonia gas and dry mineral salts applied without a liquid carrier. A more concentrated liquid formulation containing insufficient water to dissolve the minerals would be difficult to store since the minerals might settle and form a hard cake.

In accordance with the present invention, it has been found that the ammonia and the required minerals can be distributed on the plant material in a liquid formulation comprising water, ammonia, molasses and minerals manufactured in the manner set forth hereinbelow.

The minerals used in the composition are those necessary for ruminant nutrition and not normally present in silage in sufficient quantities. They include calcium sodium, magnesium, copper, zinc, cobalt, phosphorous, sulfur, chlorine and iodine. These are supplied, preferably, in the form of inorganic salts. The exact form is not considered critical, but in general sodium may be in the form of + 1 cation, calcium, magnesium and zinc are supplied as + 2 cations, cobalt may be in the form of + 2 or + 3 cation, copper may be in the form of the + 1 or + 2 cation and chlorine is supplied as chloride. Phosphorous may be supplied in phosphate or the anion of another oxy acid of phosphorous. Similarly, sulfur may be in the form of sulfate, sulfite, hydrogen sulfate or other anion of an oxy acid of sulfur. Iodine may be introduced as $I_2$, iodide or in another inorganic iodine anion.

The quantities of the minerals are most conveniently stated in terms of the amounts required per ton of 35% dry matter plant material to be stored in a silo.

| | | |
|---|---|---|
| Sodium | 415–750 | grams |
| Calcium | 215–380 | grams |
| Magnesium | 40–75 | grams |
| Copper | 1.5–3.0 | grams |
| Zinc | 10–18 | grams |
| Cobalt | 30–52 | milligrams |
| Phosphorus | 135–240 | grams |
| Sulfur | 210–375 | grams |
| Chlorine | 650–1150 | grams |
| Iodine | 135–240 | milligrams |

The second constituent is ammonia which is a colorless gas whose boiling point at normal atmospheric pressure is −33.34°C. It generally is supplied in anhydrous form in tanks under sufficient pressure to be a liquid. The gas is soluble in water to the extent of about ½ gram per gram of water at 20°C. When dissolved, small amounts become hydrolyzed to ammonium hydroxide of which a part is ionized. In the composition of the present invention, a small part of the ammonia may be converted to ammonium ion or precipitated ammonium salt because of precipitation of magnesium and calcium hydroxides. However, all will be considered to be ammonia. The preferred amount of ammonia, for each ton of 35% dry matter plant material is in the range 3.5–17.5 pounds. In addition, the ratio of sulfur to nitrogen is preferably in the range 1.5–11.5. Since cane molasses contains sulfur and calcium in significant amounts, this fact may have to be considered in computing the amounts to be added in arriving at the above amounts.

The third constituent is molasses. In this regard, the term "molasses" includes a wide variety of highly concentrated sugar solutions, more detailed information with respect to which may be had from the Encyclopedia of Chemical Technology, Second Edition, Volume 13, pages 613–632. Various grades of cane sugar molasses may be used as well as sorghum syrup, beet sugar molasses, corn molasses, citrus molasses and wood molasses. These concentrated solutions preferably should have a carbohydrate content of at least about 40%, and normally include, in addition to various sugars, small quantities of crude protein, and minerals. A typical composition for cane blackstrap molasses will be about 80% solids of which 62%, approximately, is sugars, ordinarily about 32% sucrose, 14% dextrose, and 15% levulose. Beet sugar molasses is about 51% sucrose, and also contains about 2% of other sugars.

Cane sugar molasses is preferred at the present time because it is less expensive in the U.S. than beet molasses. However, unlike beet molasses, the cane molasses is slightly acid, normally having a pH of about 5.5–6.5 whereas beet molasses is alkaline, having a pH of about 7.5–8.6. Because of this acidity, small portions of the ammonia added to cane molasses will be neutralized and converted to ammonium salts. However, in this form, they are useful as NPN.

The other constituent is water. Since molasses contains some water, one might consider this together with the molasses as comprising dilute molasses.

The proportions of materials in the composition by wieght are as follows:

Mineral mixture 5 to 25% preferably 5–15%, molasses at 80% solids 10 to 50% preferably 0–25%, water (in addition to that present in the molasses) 30 to 75% and ammonia 5 to 25% preferably 10–20%.

The process for making the product includes the steps of dissolving the minerals in water, then dissolving ammonia in the water and finally mixing in molasses.

A principal object of the sequence of steps is to keep the minerals dissolved and/or suspended and another important object is to avoid reaction between ammonia and the carbohydrates in molasses. The latter objective is achieved by dissolving ammonia into a solution or suspension of water and dissipating heat of solution before combining with molasses. The carbohydrate/ammonia reaction takes place at elevated temperatures, and the temperature should be reduced enough to avoid this. The reaction is not significant if the salt/ammonia solution is below about 90 before adding molasses so that this is a safe upper limit. Maintaining the minerals dissolved and/or suspended is achieved in part by keeping the mixture acidic initially while all or minerals are added and in part through the use of thickener which is a non-toxic natural gum or other water soluble polymer. In a preferred embodiment sodium chloride is first dissolved in the water component in an amount sufficient to supply the sodium and at least part of the chlorine components of the final product. Then the sulfur and phosphorus components are added as free acids, for example as sulfuric and phosphoric acids. These materials are agitated to form a clear solution. Then there is added a dry mixture containing the thickener and magnesium oxide in a quantity sufficient to supply the magnesium component. The magnesium may be converted at this stage to magnesium sulfate and/or magnesium phosphate. Iodine crystals may be added as a part of this mixture. This mixture is agitated thoroughly and calcium is added as chloride and/or another calcium compound such as calcium carbonate or calcium hydroxide, depending on the amount of chloride required. The calcium forms a precipitate of sulfate, phosphate and possibly hydroxide which the previously formed mixture can keep suspended. While the precipitate may settle, it can be resuspended with agitation.

Some of the minerals are not yet present in the mixture, notably copper, zinc and cobalt. However, these are used in such small quantities that they can be added later, preferably in the form of an aqueous solution. If desired, however, they may be at an earlier stage, e.g. before adding the mixture of thickener and magnesium. If iodine is introduced as iodide it is more likely to reduce copper in acid medium. Therefore, it is preferable in that event to add copper after ammonia is added.

The suspension is ready for introduction of ammonia. While ammonia is added, considerable amounts of heat are generated. In a preferred embodiment, this heat is removed by countercurrent heat exchange with cool water. The heated water then is used to dissolve sodium chloride in the first step. Finally, after cooling, the mixture is mixed with molasses.

As thickeners useful prior to introducing calcium chloride there may be mentioned methyl cellulose, carboxymethyl cellulose, startch and natural gums such as gum arabic, gum tragacanth, karaya gum, locust bean gum, guar gum and gelatin. A full description of these materials may be found at Volume 10 page 741 of the Encyclopedia of Chemical Technology, Second Edition where the term "gum" is defined as "any material that can be dissolved or dispersed in water to give viscous or mucilaginous solutions or dispersions." The amount used is about 0.1 to 2%, based on the amount of water.

The final product contains precipitated minerals in a state of suspension. During shipment and storage, these minerals tend to settle, but they can be redispersed easily. It has been found that redispersion can be achieved by withdrawing part of the liquid through a pipe or hose by means of a pump and pumping it back into the storage vessel through a recirculation line. After the mixture is stirred sufficiently, the recirculation line can be partly or completely closed, depending on how long liquid is to be dispensed, and part or all of the liquid pumped from the tank is directed into a take-off line.

The sodium chloride solution is pumped into a tank with the water. Then the phosphoric acid is added with air agitation, which is continued until ammonia is added. Sulfuric acid is added next. At this point the temperature has reached 90°–100°F. Then the miscelleneous mineral mixtute is added by pumping the liquid from the tank through a pipe, introduce the mineral mixture into the flowing liquid homogenizing the mixture and reforming the mixture to the tank. The homogenizer applies high shear which rapidly disperses the solid material in the liquid. After the solid is all added, the recirculation is continued to assure complete dispersion. The antifoam agent is introduced at this time. Then the calcium chloride solution is added to the tank.

Liquid is pumped from the tank through a reactor, then through heat exchangers to a second tank. The reactor has a center tube having small holes through it surrounded by a larger tube. Ammonia liquid is introduced in the outer tube and flows into the salt-containing liquid which is pumped through the inner tube. The ammonia is metered. If not all has been added, liquid is recirculated from the second tank through the reactor. The liquid is pumped through a pipe for a third tank.

The following example illustrates the practice of the invention.

EXAMPLE

The formulation is as follows:

| Material | % By Weight |
|---|---|
| 79.5 Brix molasses | 18.4% |
| Anhydrous ammonia | 16.5% |
| 38% Aqueous calcium Chloride solution[1] | 9.1% |
| 75% Aqueous Phosphonic Acid (Asitts PO4) | 3.3% |
| Sulfuric Acid (66°Baume) | 4.0% |
| 25% Solution of sodium chloride in water | 23.4% |
| Water | 24.3% |
| Antifoam Agent (silicone) | Trace |
| Miscellaneous Mineral Mixture[2] | 1.0% |

[1]Contains also 1% KCl, 4% NaCl, 0.5% $MgCl_2$
[2]Contains:

| | |
|---|---|
| Calcined Magnesite | 40.4% |
| $CuSO_4 . 5H_2O$ | 3.8% |
| $ZnSO_4 . H_2O$ | 16.0% |
| KI | .1% |
| $CuSO_4 . 7H_2O$ | .08% |
| Guar Gum | 39.6% |

There is a "T" coupling in the pipe through which molasses is added, and there also is a homogenizer in the line to assure thorough blending of the salt solution and molasses.

It will be appreciated that varous changes may be made in details of composition and structure and made of operation without departing from the invention.

I claim:

1. A process for the manufacture of a stable composition of matter suitable for application to plant material prior to ensiling, said composition consisting essentially of 5–25% of minerals necessary for ruminant nutrition and not normally present in silage in sufficient quantities, 5–25% molasses at 80% solids, 30 to 75% water and 5 to 25% ammonia, said process comprising mixing said minerals with the water, adding the ammonia to the resulting mixture to dissolve a substantial portion of the ammonia in the water, removing heat liberated by dissolving the ammonia in the water and mixing molasses with the ammonia containing composition obtained thereby.

2. A process as set forth in claim 1 in which the minerals are sodium, calcium, magnesium, copper, zinc, cobalt, phosphorus, sulphur, chlorine and iodine.

3. A process as set forth in claim 1 in which the molasses is cane sugar molasses.

4. A process as set forth in claim 1 in which the amount of molasses is 10–25%.

5. A process as set forth in claim 1 in which the amount of ammonia is 10–20%.

6. A process as set forth in claim 1 in which the total amount of said minerals is 5–15%.

* * * * *